United States Patent
Muenker et al.

(10) Patent No.: US 8,364,108 B2
(45) Date of Patent: Jan. 29, 2013

(54) SIGNAL PROCESSING DEVICE AND METHOD FOR OPERATING A SIGNAL PROCESSING DEVICE

(75) Inventors: Christian Muenker, Munich (DE); Bernd-Ulrich Klepser, Starnberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 182 days.

(21) Appl. No.: 12/543,396

(22) Filed: Aug. 18, 2009

(65) Prior Publication Data
US 2009/0305649 A1 Dec. 10, 2009

Related U.S. Application Data

(62) Division of application No. 11/342,101, filed on Jan. 27, 2006, now Pat. No. 7,627,299.

(30) Foreign Application Priority Data
Jan. 28, 2005 (DE) .................. 10 2005 004 105

(51) Int. Cl.
*H04B 1/06* (2006.01)
(52) U.S. Cl. .................. 455/234.1; 455/323; 455/338; 375/345

(58) Field of Classification Search .................. 455/230, 455/232.1, 234.1, 313, 318, 323, 338–341; 375/345
See application file for complete search history.

(56) References Cited

U.S. PATENT DOCUMENTS 6,081,698 A * 6/2000 Moriyama et al. ............ 455/126
2002/0042256 A1* 4/2002 Baldwin et al. ............ 455/232.1

OTHER PUBLICATIONS

File History, U.S. Appl. No. 11/342,101, Patent No. 7,627,299, filed May 19, 2004, Jan. 27, 2006, Jul. 21, 2009 Notice of Allowance and Fees Due (PTOL-85), Jul. 21, 2009 List of References cited by applicant and considered by examiner, and Jul. 21, 2009 List of References cited by applicant and considered by examiner.

* cited by examiner

*Primary Examiner* — Nhan Le
(74) *Attorney, Agent, or Firm* — SpryIP, LLC

(57) ABSTRACT

A control circuit may be provided. In this case, an output of the control circuit is connected to a control input of a signal generator. Depending on internal signals which identify an operating state of a signal processing device, the control circuit generates a regulating signal at the output. The operating point of the signal generator is thereby set in such a way that a current consumption of the signal processing device is reduced, so that the signal quality is ensured in a sufficient manner.

9 Claims, 4 Drawing Sheets

SIGNAL PROCESSING DEVICE AND METHOD FOR OPERATING A SIGNAL PROCESSING DEVICE

RELATED APPLICATIONS

This Application is a Divisional Application of application Ser. No. 11/342,101, which claimed priority of German Application DE 102005004105.1. The priority of the Applications are hereby claimed and the entirety thereof are hereby incorporated herein by reference.

BACKGROUND

Signal processing devices, in particular radiofrequency transceivers, are used inter alia in mobile communication devices which have only a limited supply of energy, usually in the form of a battery or a rechargeable battery. Therefore, the requirement exists for a low current consumption of such transceivers, in order to increase the so-called service life of mobile communication devices. In the case of radiofrequency transceivers, the current consumption is particularly dependent on the operating point of the individual switching components of a transceiver. In this case, the term operating point defines that region of the family of characteristic curves of the circuit component which is used in operation of the circuit component. The operating point is determined by a supply voltage, a supply current or a programming voltage.

In addition to the current consumption, the operating point also influences the system properties of the transceiver. Thus, by way of example, the operating point of the circuit components of a receiver front end of a transceiver influences the noise figure and also the signal/noise ratio of a received and partly processed signal. The operating point of a receiver amplifier in a transceiver can alter the linearity of a reception amplifier and thus lead to distortions. Linearity and signal/noise ratio are of particular importance for the data transmission quality.

Operating points in circuit components of the transmitter influence the transfer response during the signal processing and thus the output power and also the frequency spectrum of the output signal.

In order to ensure error-free operation even under unfavorable conditions, for example in the case of small input signals and high external temperatures, it is necessary to choose the operating points suitably for such conditions. As a result, under favorable conditions more current is consumed than would be necessary to achieve the required properties with regard to the signal quality.

In modern radiofrequency transceivers and signal processing devices, the operating points of individual circuit components are therefore programmed suitably or predefined for a critical case. One example of a programming of a radiofrequency transceiver via the baseband unit—connected in the transceiver—by means of a three-conductor bus is shown by the document U.S. Pat. No. 5,994,931. Via this interface, by way of example, the operating point of the input amplifiers of the transceiver is set and the current consumption is thus reduced depending on input signals. The signals transmitted via the interface are generated by a control circuit in this case. For this purpose, however, it is necessary to assess signals representing states of the transceiver. In the context of the increasing integration density and the desire to integrate as many switching components as possible in a semiconductor body, the construction with a three-conductor bus and external control circuits means additional space requirement and costs.

SUMMARY OF THE INVENTION

One object of the invention is to further reduce the current consumption of a signal processing device in particular of a radiofrequency transceiver. A further object of the invention is to provide a method by means of which a signal processing device can be operated in low-power fashion.

In one aspect of the invention, the signal processing device contains at least two processing elements. The latter are each embodied for assuming one of at least two operating states that can be assumed for a signal processing of useful signals fed in a manner dependent on a control signal. A signal processing of circuit components of the signal processing device is thus carried out, it being possible to provide different operating modes or modes of operation for this depending on the type of signal processing. Furthermore, the processing device comprises at least one device for detecting a parameter of the signal processing device. Said parameter identifies an operating state of the signal processing or else alternatively a property of the useful signal. Finally, an evaluation device is embodied for generating the control signals in a manner dependent on an evaluation of the detected parameter.

By means of the invention, operating parameters of individual circuit components are set, preferably for optimizing a power consumption of the processing device. According to the invention, the regulation is effected on account of on-chip signals or states.

In one aspect of the invention, the signal processing device, which may be formed in a semiconductor body, comprises a terminal on a surface of the semiconductor body. The terminal may be embodied for being coupled to an antenna. A terminal node is formed for coupling to a baseband signal unit for processing of digital signals. A frequency conversion device having a first terminal, having a second terminal and having a local oscillator input is connected between the terminal and the terminal node of the signal processing device. Specifically, the first terminal of the frequency conversion device is coupled to the terminal of the signal processing device. A signal generator having a reference input, a control input for setting its operating point and a signal output is connected by the signal output to the local oscillator input of the frequency conversion device. Finally, a control circuit is provided, which is embodied for providing a regulating signal at an output depending on at least one control signal. The control signal may represent a state of the signal processing device but also a property of a useful signal provided for the signal processing. Furthermore, the output of the control circuit is connected to the control input of the signal generator.

In accordance with the principle posed, the operating point of the signal generator is set for operation as a local oscillator by means of the control circuit, by the regulating signal output by the latter. By virtue of the setting of the operating point of the signal generator, the latter is optimized with regard to its current consumption. The amplitude and the noise of its output signal, which is used as local oscillator signal, also change at the same time. Given suitable useful signals, preferably given useful signals having high levels, the amplitude of the local oscillator signal and thus the current consumption of the signal generator can be suitably reduced by setting the operating point without the useful signal quality being significantly impaired by the thus increased noise. This measure reduces the power loss of the signal processing device.

A further advantage consists in the fact that an operating state of the signal processing device is evaluated within the semiconductor body by means of the control circuit. The power consumption is advantageously regulated in this way without further external control signals. Preferably, the control signal represents a temperature of the semiconductor body. As an alternative, the control signal identifies a supply voltage of the device, an input signal level, a desired output level or a modulation method. In a further embodiment, the control signal represents a value of a signal/noise ratio of an input signal, a quality of the reception signal, an amplitude of an interference signal, or the value of an adjacent channel power.

In one aspect, a converter is provided, which is coupled to the second terminal of the frequency conversion device and to the terminal node of the signal processing device. The converter is embodied for converting analog signals into digital signals or for converting digital signals into analog signals.

In one advantageous refinement of the invention, a low-pass filter is connected between the second terminal of the frequency conversion device and the converter. In one embodiment, the low-pass filter is embodied as an active filter having an actuating input, to which can be fed a regulating signal for setting the operating point of the low-pass filter for operation of the filter. The actuating input of the low-pass filter is coupled to the output of the control circuit.

In one development of the invention, the converter is formed as a digital-to-analog converter. In one embodiment of the invention, the digital-to-analog converter comprises an actuating input coupled to the output of the control circuit. The digital-to-analog converter is embodied for converting a digital signal into a corresponding analog signal with a first resolution or at least a second resolution depending on an actuating signal at the actuating input. In other words, in this embodiment, it is possible to set the resolution of the digital-to-analog converter, the bit width, the algorithmic complexity and/or the clock rate of the digital signal processing by means of a corresponding regulating signal of the control circuit at the actuating input of the digital-to-analog converter. As a result, preferably, in the case of digital input signals which have a large amplitude, it is possible to reduce the resolution and thus the current consumption of the digital-to-analog converter.

In another embodiment of the invention, the converter is embodied as an analog-to-digital converter. In one development, the analog-to-digital converter has an actuating input coupled to the output of the control circuit. The analog-to-digital converter is embodied for converting an analog signal into a digital signal with a first resolution or with at least a second resolution depending on an actuating signal at the actuating input of the analog-to-digital converter. In one preferred embodiment, it is possible to regulate the resolution, the bit width and/or the clock rate in the digital signal processing of the analog-to-digital converter depending on an actuating signal at the actuating input of the converter.

In another embodiment, an amplifier having a variable gain is connected between the terminal of the signal processing device and the frequency conversion device. As an alternative, the amplifier is embodied for setting its current consumption and also noise figure and/or its linearity. Preferably, said amplifier has a regulating input for setting its operating point, which is connected to the output of the control circuit. By changing the operating point of the amplifier, it is possible to achieve a reduction of the power consumption of the entire signal processing device. In one expedient embodiment, the amplifier is embodied in the semiconductor body as an integrated circuit. As an alternative, it is formed as an external amplifier outside the semiconductor body.

In another development, a level detector is arranged between the amplifier and the frequency conversion device, said level detector being embodied for determining a signal level and for outputting a level signal to the control circuit. In this embodiment, the level signal to the control circuit represents the at least one parameter by means of which the control circuit provides the regulating signal at its output. Consequently, depending on the signal level of a signal, the power regulator generates a regulating signal for setting the operating point and thus for reducing the power consumption of the signal processing device.

In one embodiment of the invention, the frequency conversion device of the signal processing device is embodied as I/Q demodulator with a first and a second frequency mixer embodied for image frequency rejection. In this refinement, the signal processing device thus forms a reception device for radiofrequency signals.

In another embodiment, the frequency conversion device of the signal processing device is embodied as an I/Q modulator with a first and a second frequency mixer. These frequency mixers are preferably also formed with image frequency rejection. In the embodiment with an I/Q modulator, the signal processing device forms a transmission device for radiofrequency signals.

In another refinement of the invention, the signal generator comprises a phase locked loop containing a voltage controlled oscillator. The voltage controlled oscillator has a regulating input for setting its operating point. The regulating input of the voltage controlled oscillator is connected to the control input of the signal generator.

In one refinement, a digital-to-analog converter is connected between the regulating input of the voltage controlled oscillator and the control input of the signal generator, and converts a digital regulating signal present at the control input of the signal generator into an analog signal and feeds it to the regulating input of the voltage controlled oscillator for setting its operating point.

In another development of the invention, the voltage controlled oscillator is connected to an amplifier on the output side. An output of the amplifier forms the signal output of a signal generator. The amplifier has a regulating input connected to the control input and serving for setting its operating point. In these refinements, the power consumption of the signal generator is controlled by means of a regulating signal at its actuating signal by means of the setting of the operating points of individual circuit components of the signal generator. In one preferred embodiment, the voltage controlled oscillator is embodied for regulating its supply current in a manner dependent on a signal present at the control input of the signal generator.

With regard to the method, the object is achieved by means of a method for operating a signal processing device, comprising the steps of:
  providing a signal processing device having a frequency conversion device, and a signal generator;
  applying a signal to be processed to the frequency conversion device;
  determining at least one parameter which identifies an operating state of the signal processing device;
  generating a control signal in a manner dependent on the parameter;
  controlling the power consumption of the signal generator with the control signal;
  generating a local oscillator signal;

and converting the signal to be processed with the local oscillator signal.

The invention involves determining a parameter which identifies an operating state of the signal processing device and controlling the power of the signal generator depending on this. Consequently, the power consumption of the entire signal processing device is regulated in a suitable manner depending on the parameter. By way of example, a temperature of the signal processing device, a supply voltage for operation, an input signal level, is determined. The control signal is then generated therefrom. Accordingly, internal states of the signal processing device are preferably evaluated. The method is suitable particularly for devices which are realized as integrated circuits in a semiconductor body in which an evaluation of states of the device and the regulation are effected completely within the semiconductor body and so there is no need for additional signals to be passed out of or into the semiconductor body.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 7:
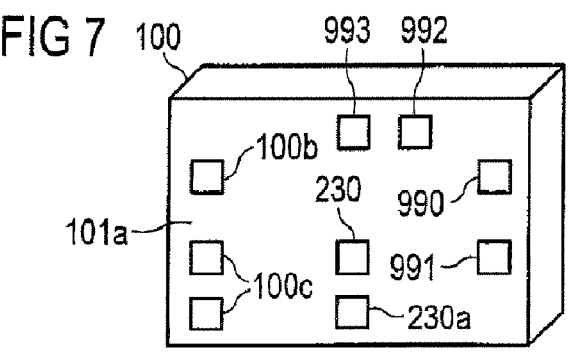
FIG. 7 shows an illustration of a semiconductor body in which the signal processing device is realized.

FIG. 7 shows a semiconductor body in which the signal processing device is implemented. The semiconductor body is formed from silicon, for example, but other semiconductor materials such as gallium arsenide or silicon-germanium are also suitable. The individual switching elements are then integrated into such a semiconductor. A CMOS technology, by way of example, is suitable for this, but so, too, is a pure n-MOS or p-MOS technology. The individual switching elements and assemblies are produced for example by lithographic methods and various implementation techniques. Various techniques for producing large scale integrated circuits in semiconductors are known.

The semiconductor body 100 has a plurality of terminal contacts, which are also referred to as contact pads, on its surface. They are formed from a metal, often applied by vapor deposition, and have only a low resistance in order to enable good electrical contact-connection. The contact pads on the main side 101a also form the terminals of the signal processing device integrated in the semiconductor body. They include the contact pads 100b, for example, which are formed in a manner suitable for feeding in or for outputting radiofrequency signals. Other contact pads, for example 100c, carry digital baseband signals. Further terminals 990, 991 serve for feeding in supply current and supply voltage and external control signals 992, 993 for setting a special operating mode.

Figure 1:
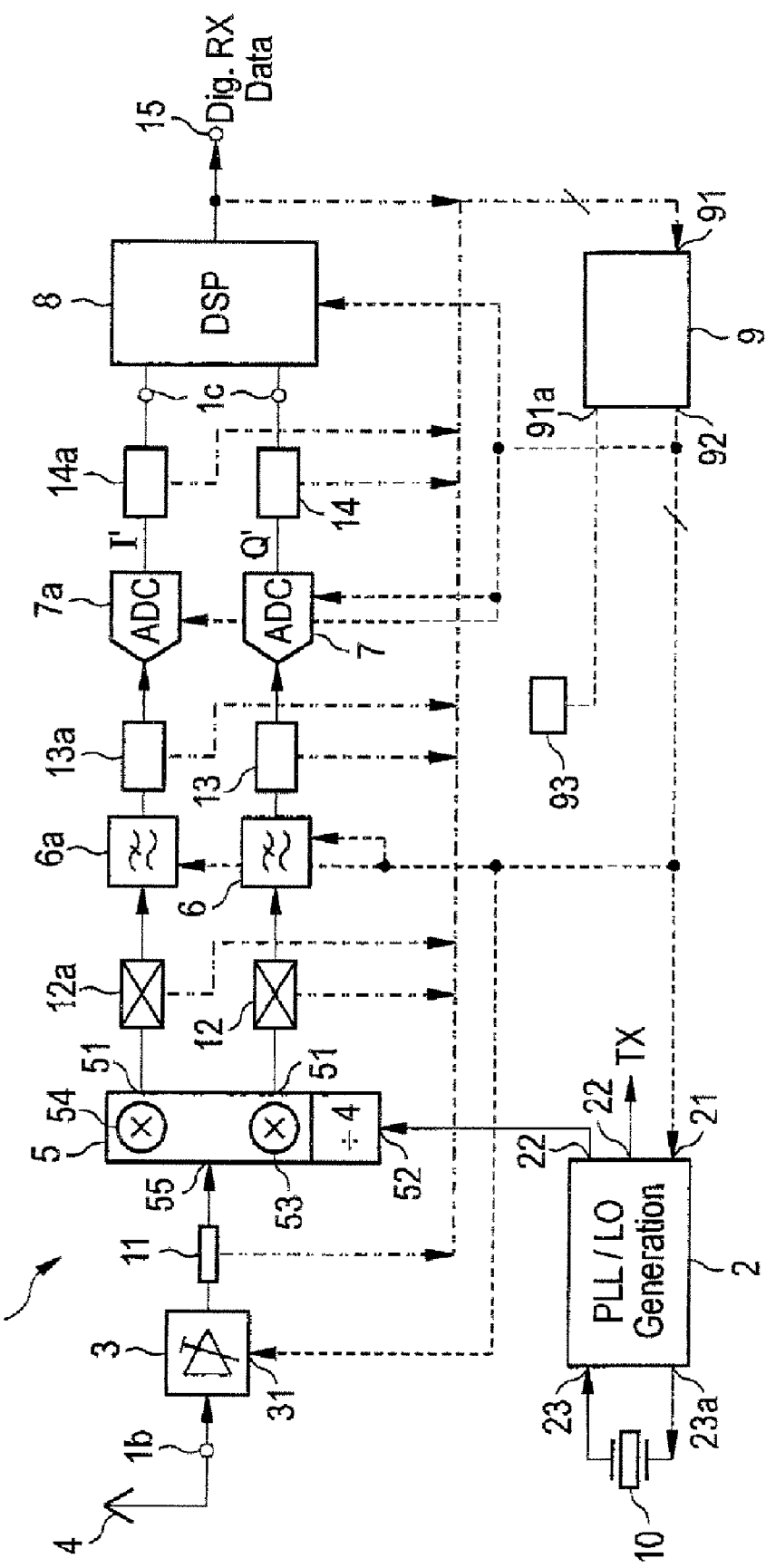
FIG. 1 shows a first exemplary embodiment of the signal processing device in the form of a radiofrequency receiver.

FIG. 1 shows a block diagram of one embodiment of the signal processing device 1 according to the invention in the form of a reception device in a mobile communication device. In this case, the reception device is embodied as an integrated circuit in the semiconductor body 100 in accordance with FIG. 7. The arrows illustrated indicate the direction of propagation of a signal in the signal processing device.

The construction of the signal processing device by means of an integrated circuit in the semiconductor body makes it possible to directly process various internal generated signals and to control the entire power consumption of the individual circuit components of the signal processing device on the basis of said signals. Therefore, an external controller is only partly necessary. Internal signals of this type are for example the temperature, the operating voltage, the operating current and the signal power.

The embodiment illustrated here is connected by a first terminal 1b to an antenna 4 for receiving and feeding in a radiofrequency signal. The terminal 1b simultaneously forms the contact pad 100b on the main side 101a of the semiconductor body 100.

The output terminals 1c of the signal processing device are formed by the contact pads 100c on the main side 101a of the semiconductor body 100 in accordance with FIG. 7. Connected to them is a baseband unit 8, which is embodied for processing digital signals and generates therefrom a data stream RX data at the output 15. In this exemplary embodiment, the baseband unit 8 is arranged outside the semiconductor body, that is to say that the contact pads 100c lead to the inputs of the baseband unit 8. It is nevertheless possible, as an alternative, for the baseband unit also to be formed within the semiconductor body 100. The baseband unit 8 then forms a part of the signal processing device according to the invention, the output 15 being formed by a contact pad on the main side 101a of the semiconductor body.

The signal processing device 1 according to the embodiment contains a signal path arranged between the first terminal 1b and the second terminal 1c. Specifically, the terminal 1b is coupled to the input of a reception amplifier 3 within the semiconductor body. The reception amplifier is embodied with particularly low noise and has a settable operating point. The output of the reception amplifier 3 is connected to a level detector 11 and to the input of an I/Q demodulator 5.

Figure 6:
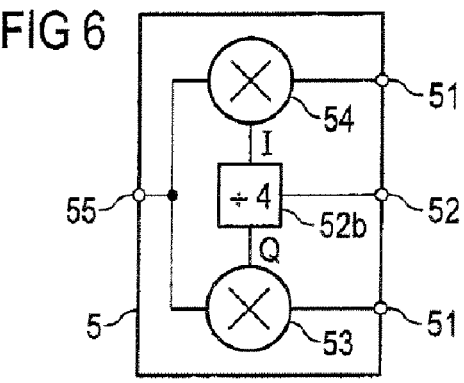
FIG. 6 shows an embodiment of an I/Q demodulator with a frequency divider circuit.

FIG. 6 shows one embodiment of the I/Q demodulator, which is formed as an integrated circuit in the semiconductor body. The demodulator is connected by its input 55 to the inputs of two mixers 53 and 54. In each case a local oscillator signal component 1, Q is fed to the two frequency mixers 53 and 54. Said signal components are provided by a frequency divider 52a, which divides a local oscillator signal present at its input 52 by the factor four and generates therefrom a signal having two components I and Q that are phase-offset by 90° with respect to one another. One of the two components I is fed to the first frequency mixer 54 at its local oscillator input, and the other component Q is fed to the second frequency mixer 53.

The two frequency mixers convert a signal present on the input side to an intermediate frequency with the aid of the respective local oscillator signal components and output it at the output 51. Owing to the property of the phase offset of the two local oscillator components I and Q, this operation is also referred to as I/Q demodulation.

The outputs 51 of the I/Q demodulator 5 are connected to a respective further level detector 12 and 12a and also to a respective low-pass filter 6 and 6a. A bandpass filter can also be used instead of a low-pass filter. The outputs of the two low-pass filters 6 and 6a are connected to further level detectors 13, 13a and to the inputs of two analog-to-digital converters 7 and 7a. The latter generate a digital value from a signal present on the input side and output said digital value at the output.

The outputs of the two analog-to-digital converters are connected to the terminals 1c of the signal processing device, which, for their part, are coupled to the baseband unit 8. The baseband unit is embodied as a signal processor unit and processes the digital signals. In this case, the two components I', Q' now present as digital values are demodulated and a data stream is generated which contains the demodulated information of the signal present at the first terminal 1b.

The power consumption of the signal processing device according to the invention can be controlled depending on the input power of the signal fed in via the antenna 4 and to the input amplifier 3. For this purpose, level detectors 11, 12, 12a and 13, 13a are provided at various points; they determine the level of the analog signal and forward it to a control circuit 9. Items of information relating to the converted digital value are likewise also fed to the devices 14 and 14a and to the power regulator 9.

In addition, temperature sensors 93 are present in various regions of the semiconductor body; they determine the temperature there and forward this to the control circuit 9. The temperature represents an important parameter for a good operating point setting and thus a power consumption. It is expedient, therefore, to provide the temperature sensors 93 in spatial proximity to the circuit component of the signal processing device in the semiconductor body whose operating point is intended to be regulated by means of correspondingly assessed signals.

The control circuit 9 determines from the individual values control parameters by means of which the operating point of individual circuit components can be altered, a sufficient signal quality being ensured. As a result, the current consumption of the signal processing device in the semiconductor body is reduced in a suitable manner, as a result of which the power loss also decreases. In the present exemplary embodiment, the control circuit 9 outputs a correspondingly digital regulator signal at its output 92 to a signal generator 2, the analog-to-digital converters 7 and 7a and also the digital signal processor 8.

With this regulating signal at its control input 21 the signal generator 2 sets anew its operating point for generating a local oscillator signal and thus its operating behavior. It is connected by its local oscillator output 22 to the local oscillator input 52 of the frequency conversion device. The operating point of individual circuit components of the signal generator 2 is thus changed depending on the regulating signal at the actuating input 21. The current consumption and thus the power loss are changed, for example reduced, the signal quality furthermore being sufficient for the processing. In the event of a change in the operating points of individual components of the signal generator 2, the amplitude of the local oscillator signal at the output 22 also changes.

This means in concrete terms that for high levels of a signal present on the input side, a current consumption of the local oscillator is reduced by altering the operating point. As a result of the change in the operating point, the signal generator 2 is operated in a region with lower power consumption but also greater noise. The greater noise may be disregarded, however, with respect to the gain on account of the lower power consumption.

The regulating signal of the control circuit 9 is likewise fed to the two analog-to-digital converters 7 and 7a. In a manner dependent thereon, the analog-to-digital converters reduce their resolution, their bit width and/or the clock rate for the digital signal processing. Changes in a plurality of these parameters are likewise possible. A reduction of the resolution and/or of the clock rate for the digital signal processing also reduces the current consumption of the converters. However, only few additional errors occur despite the reduction of the resolution or the clock rate of the digital signal processing on account of the high input signal. Through the active control of the analog-to-digital converters the power consumption and thus the power loss can be reduced without generating additional errors during the conversion and significantly reducing the signal quality.

Figure 2:
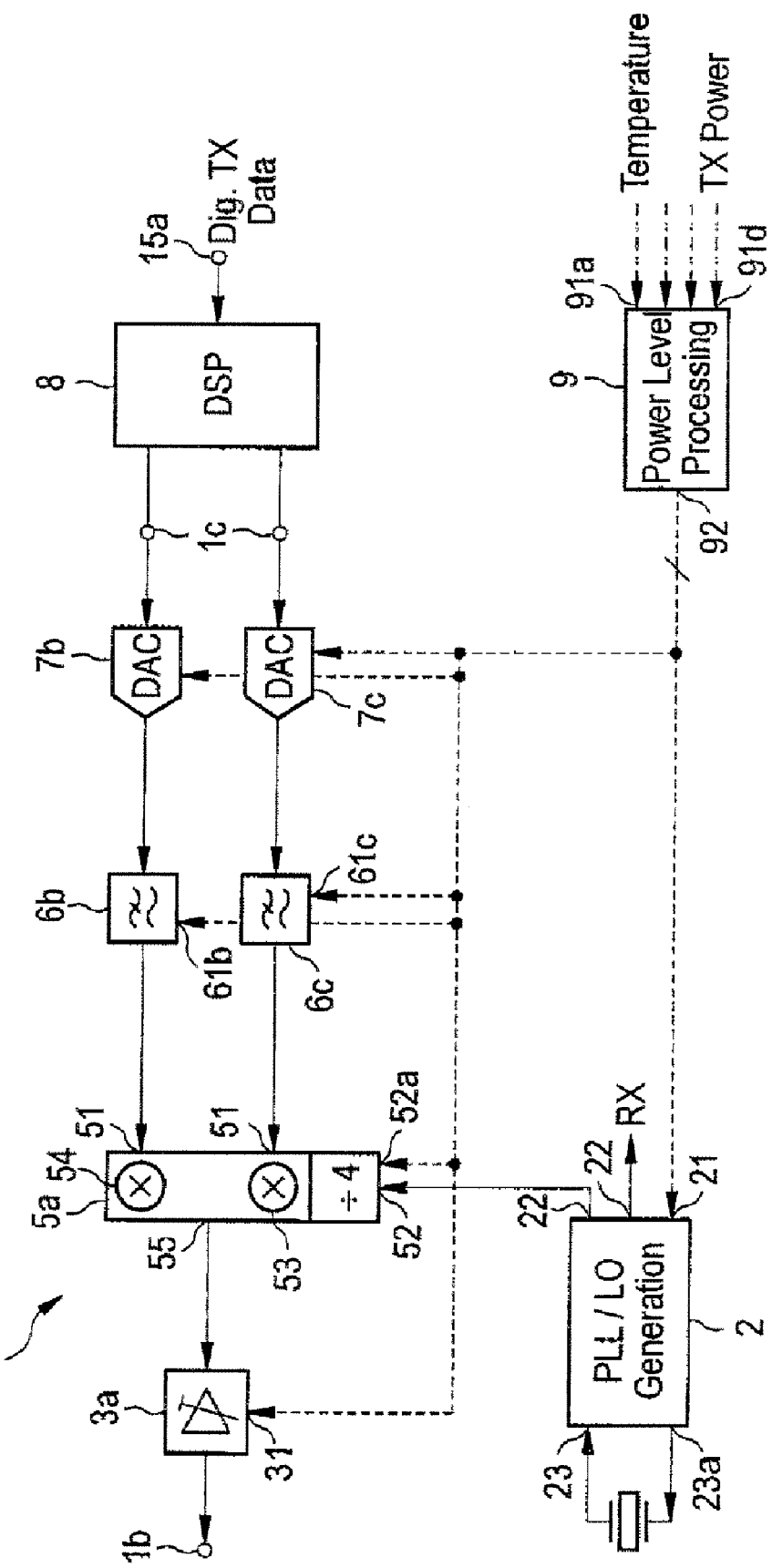
FIG. 2 shows a second exemplary embodiment of the signal processing device, here as a radiofrequency transmitter.

In the same way, it is also possible to reduce the power loss in a transmission device by suitable setting of the operating points of the various circuit components. FIG. 2 shows such an example of a signal processing device 1a which is embodied as a transmission device and is likewise implemented in a semiconductor body. Operationally or functionally identical components bear the same reference symbols.

The transmission device additionally has a baseband unit 8 implemented in the semiconductor body 100 in accordance with FIG. 7. The input terminal 15a is embodied as a contact pad on the main side of the semiconductor body. The items of information to be transmitted are applied to said input terminal as digital data. The baseband unit 8 generates digital values therefrom in accordance with a modulation specification. Said digital values are fed to the node 1c connected to digital-to-analog converters 7b and 7c. The two digital-to-analog converters 7b, 7c convert the digital signals present at the terminals 1c into analog signals. They are subsequently fed via a low-pass filter 6b, 6c to the inputs of an I/Q modulator 5a. The low-pass filters serve for suppressing undesirable higher-order frequency components that arise as a result of the conversion in the two converters.

The I/Q modulator 5a is constructed in a similar manner to the I/Q demodulator in accordance with FIG. 6. It, too, contains two mixers 53 and 54 and also a frequency divider which divides the signal present at the local oscillator input of the I/Q modulator 5a by the factor 4 and provides two components I and Q. One of the components in each case is fed to the local oscillator input of one of the two frequency mixers. With the aid of the two components I, Q, the analog baseband signals filtered by the low-pass filters 6b and 6c are converted to the output frequency, then added and provided at the output 55. The output 55 is connected to an output amplifier 3a having a variable gain.

In this exemplary embodiment, too, a control unit 9 is provided in the semiconductor body. The latter contains a plurality of inputs 91a to 91d at which signals representing different internal states of the signal processing device and of the semiconductor body are present. These are on the one hand a temperature, a supply voltage, an operating mode but also the power to be output and the type of modulation used by the baseband unit 8. The control circuit 9 generates a plurality of regulating signals from these parameters and outputs them at its output 92. The output 92 is in turn connected to the signal generator 2, and the digital-to-analog converters 7b and 7c. Furthermore, it is connected to an actuating input of the output amplifier 3a for setting the operating point thereof.

Furthermore, the low-pass filters 6b and 6c in each case also contain an actuating input 61b and 61c for setting their operating point. An actuating signal is likewise fed to a regulating input 52a of the I/Q modulator for operating point settings thereof within the frequency divider and the individual mixers. The power loss can be reduced by the setting of the operating points of the low-pass filters, of the I/Q modulator and of the output stages, a sufficient signal quality remaining ensured at the same time.

Figure 3:
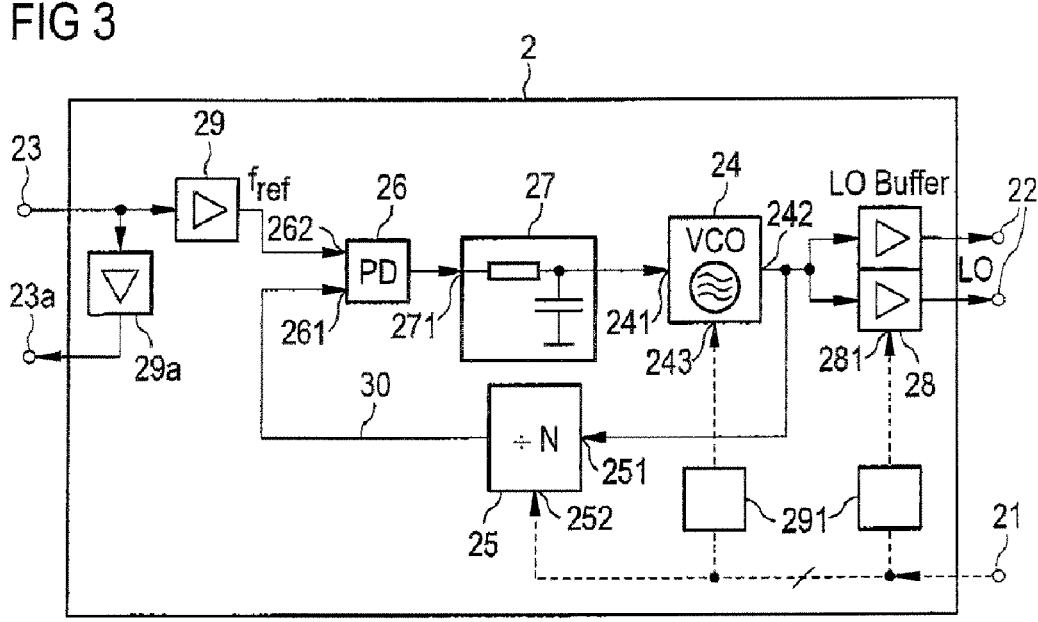
FIG. 3 shows an exemplary embodiment of the phase locked loop with settable operating point.

FIG. 3 shows a block diagram of a signal generator 2 as is implemented in the semiconductor body. The signal generator 2 is embodied as a phase lock loop. For this purpose, it contains a phase detector 26 having a reference input 262 and a feedback input 261. A reference signal having a reference frequency fref is fed in at the reference input 262. Said reference signal is provided by a resonant circuit 10 as shown for example in FIG. 1 and FIG. 2. The resonant circuit 10 is distinguished by a particularly accurate and constant oscillation and is situated outside the semiconductor body. The terminals 23 and 23a for the phase locked loop 2 are formed as contact pads 230 and 230a on the main side 101a of the semiconductor body.

The signal output by the resonant circuit 10 is amplified at the input 23 by means of an amplifier 29 and applied to the input 262. It is simultaneously fed back to the resonant circuit 10 again via a deattenuation amplifier 29a and the output 23a.

The phase detector 26 compares the phases of the signals present at the two inputs 261 and 262 and generates an actuating pulse therefrom, and feeds said actuating pulse to the input 271 of a device 27 comprising charge pump and loop filter. In this case, the actuating pulse is a measure of a phase deviation of the signals present at the inputs 261 and 262. The charge pump and the loop filter are indicated here by means of a parallel-connected capacitor and an impedance connected into the signal path.

The output of the device 27 is connected to the control input 241 of the voltage controlled oscillator 24. On the basis of an actuating signal at the input 241, the voltage controlled oscillator generates an output signal at its output 242. Said output signal is fed in a feedback path to an input 251 of a frequency divider 25. The output of the frequency divider is in turn connected to the input 261 of the phase detector 26.

Moreover, the output of the voltage controlled oscillator 24 is connected to a buffer amplifier 28. The latter amplifies the oscillator signal and outputs it at the output 22 of the signal generator circuit 2.

In order to reduce the power consumption of the signal generator 2, the actuating input 21 is coupled to the frequency divider 25, to the voltage controlled oscillator 24 and also to the buffer amplifiers 28. Thus, by way of example, the buffer amplifier 28 contains an actuating input 281 for setting its operating point. The operating point and thus also the gain and the power loss of the buffer amplifier 28 can be set on the basis of these regulating signals. For this purpose, the actuating input 281 of the buffer 28 is connected to the actuating input 21 via a digital-to-analog converter 291. The regulating signal fed to the actuating input is converted into an analog actuating signal by the digital-to-analog converter 291 and fed to the input 281 for setting the operating point.

The voltage controlled oscillator 24 likewise also has an actuating input for setting its operating point. This input, too, is connected to the actuating input 21 via a digital-to-analog converter. The deattenuation amplifier 29 has an actuating input connected to the input 21. Via this input it is possible to set the operating point and thus the current consumption of the deattenuation amplifier.

Figure 4:
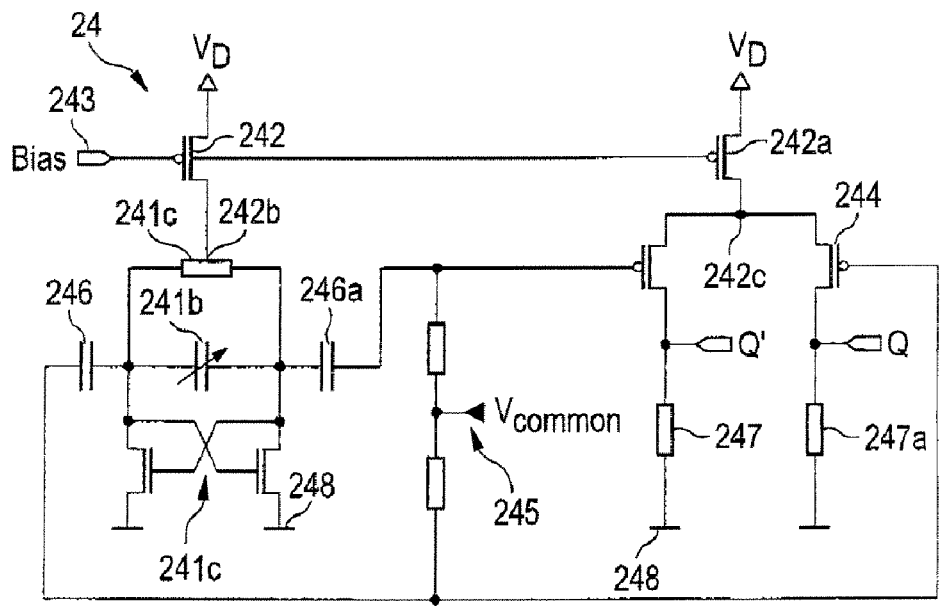
FIG. 4 shows a refinement of a voltage controlled oscillator.

FIG. 4 shows a refinement of a voltage controlled oscillator 24 in which the operating point can be set by regulating the supply current. In this case, the voltage controlled oscillator 24 is indicated with a deattenuation amplifier 241a and also a tunable capacitance element 241b, which together with a coil 241c forms a resonant circuit. The deattenuation amplifier 241a, which is formed from two cross-coupled field effect transistors, serves for the deattenuation and compensation of the attenuating portions of the resonant circuit comprising the coil 241c and the tunable capacitance element 241b. The capacitance element 241b is tuned by means of the signal at the actuating input 241 of the voltage controlled oscillator 24 in accordance with FIG. 3.

Output nodes of the voltage controlled oscillator are in each case radiofrequency-coupled via two capacitors 246 and 246a and connected to a setting voltage Vcommon via a resistor in each case. The voltage serves for controlling an output buffer embodied as a differential amplifier 244. Specifically, a first output node of the voltage controlled oscillator is connected to the control terminal of a first field effect transistor of the differential amplifier 244, and the second output node of the voltage controlled oscillator is in each case connected to the control terminal of the other field effect transistor of the differential amplifier. Output taps Q and Q' of the differential amplifier form the output of the voltage controlled oscillator.

Two further control transistors 242 and 242a are in each case provided for regulating the operating point. The control transistors are connected between the supply potential VDD and the node 242b in the resonant circuit and, respectively, the node 242c of the differential amplifier 244. They are connected by their control terminals to the actuating input 243. Therefore, the operating point of the voltage controlled oscillator and also of the output buffer is set by controlling the conductivity of the two transistors 242 and 242a.

Figure 5:
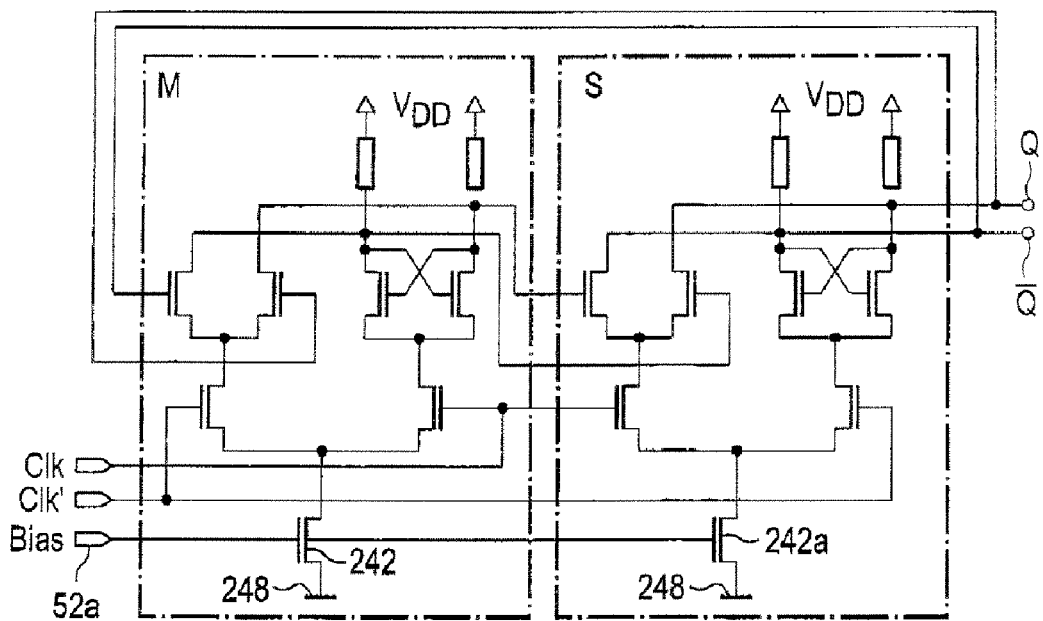
FIG. 5 shows a flip-flop circuit with settable power consumption.

FIG. 5 shows a further embodiment of a circuit component of the signal processing device whose supply current or supply voltage can be regulated by means of the actuating signal. This is a detail from a frequency divider circuit of the I/Q modulator and I/Q demodulator in accordance with FIG. 1 and FIG. 2 and also a circuit 25 in accordance with FIG. 3. In this case, the frequency divider circuit is embodied as feedback master-slave flip-flop. The operating point is set via two control transistors 242 and 242a connected between the master-slave flip-flop and the ground potential 248. The control terminals of the two transistors 242 and 242a are again connected to the regulating input 52a.

Parameters that identify operation of the signal processing device are determined in the signal processing device. In this case, it is possible to use purely on-chip signals or to assess states such as temperature or operating voltage. It is likewise possible, as illustrated in FIG. 1, to determine levels of an input signal by means of various level detectors at different points within the signal path, and to transfer them to the control circuit.

Regulating signals for an optimum power consumption in conjunction with good signal quality are determined therefrom by the control circuit 9. The individual operating points of the various circuit components of the signal processing device are subsequently set. An action externally for example by transmission of additional parameters is not necessary.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A signal processing device, comprising:
   at least two processing elements each configured to assume one of at least two operating states that can be assumed for a signal processing of useful signals fed in a manner dependent on a control signal;
   at least one device configured to detect a parameter of the signal processing device which identifies an operating state of the signal processing device; and
   an evaluation device configured to generate the control signal in a manner dependent on an evaluation of a detected parameter, wherein the evaluation device is configured to generate the control signal in such a way that consumption of the at least two processing elements is controlled.

2. The signal processing device as claimed in claim 1, wherein the detected parameter is derived from:
   a temperature in at least one partial region of the signal processing device; a supply voltage or a supply current of the signal processing device;
   a level of the useful signal fed in;
   a level of a signal to be output by the signal processing device;
   an adjacent channel power of the useful signal fed in;
   a signal/noise ratio of the useful signal fed in;
   an amplitude of an interference signal in the useful signal fed in; or
   a quality of a reception channel in the useful signal fed in.

3. The signal processing device as claimed in claim 2, wherein the at least one of the at least two processing elements is configured to set its operating point in a manner dependent on the control signal.

4. The signal processing device as claimed in claim 1, wherein the evaluation device is configured to generate the control signal in such a way that, under a predefined quality of the signal processing, a total power consumption of the at least two processing elements is reduced.

5. The signal processing device as claimed in claim 1, wherein at least one parameter comprises a temperature, a signal level of a signal to be processed, a supply voltage of the signal processing device, an adjacent channel power, a reception signal quality, an interference signal power, or a signal/noise ratio of a signal.

6. The signal processing device as claimed in claim 1, further comprising a phase locked loop including a voltage controlled oscillator.

7. The signal processing device as claimed in claim 6, wherein the voltage controlled oscillator is configured to regulate a supply current associated therewith, the regulation of the supply current being dependent on a signal present at an input of the signal generator.

8. The signal processing device as claimed in claim 1, wherein the signal processing device is a radio frequency transceiver, the radio frequency transceiver being embodied as an integrated circuit of a semiconductor body.

9. The signal processing device as claimed in claim 1, further comprising an amplifier, a level detector and a demodulator, the amplifier being coupled to the level detector and the demodulator.

* * * * *